United States Patent Office 3,448,998
Patented June 10, 1969

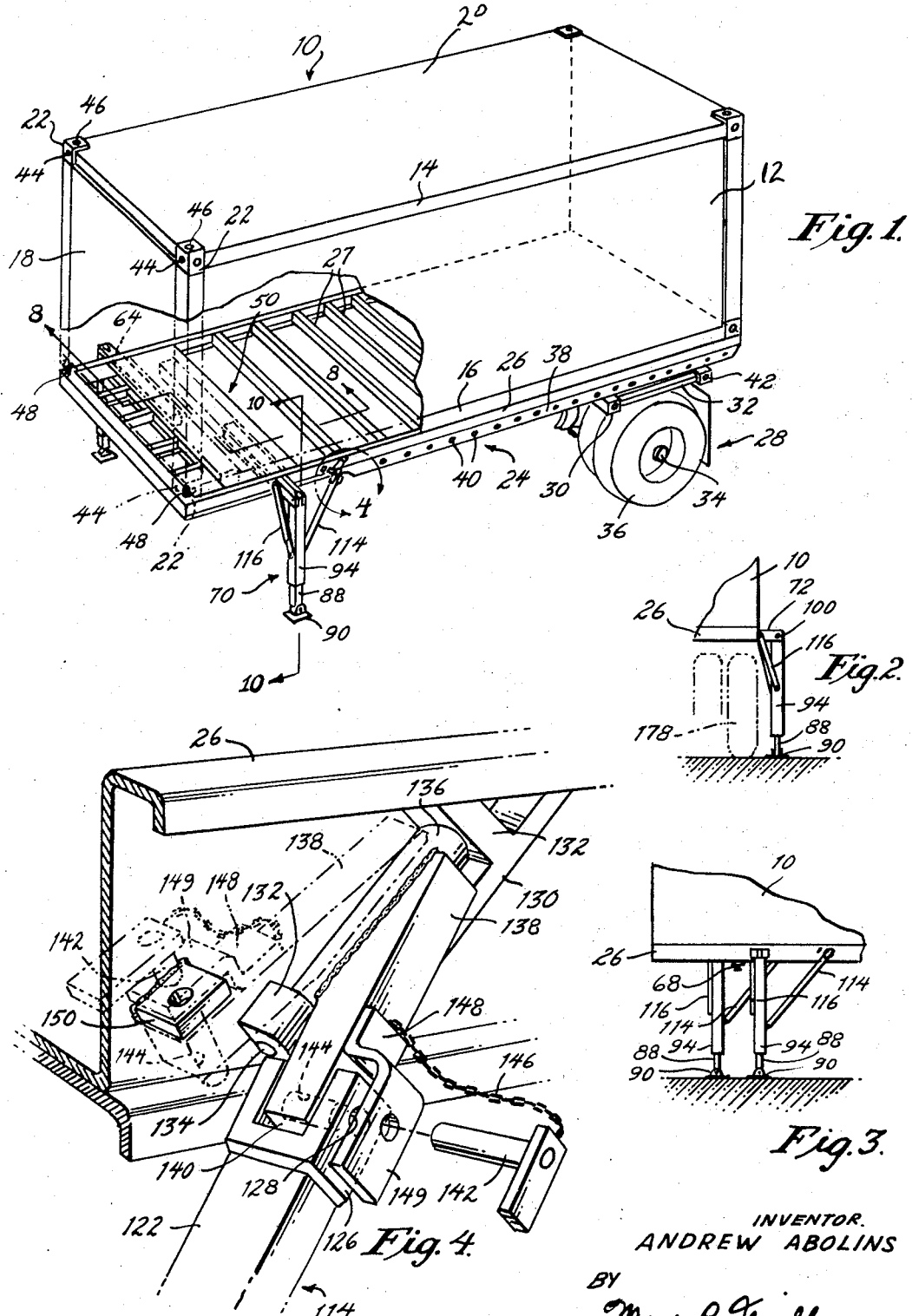

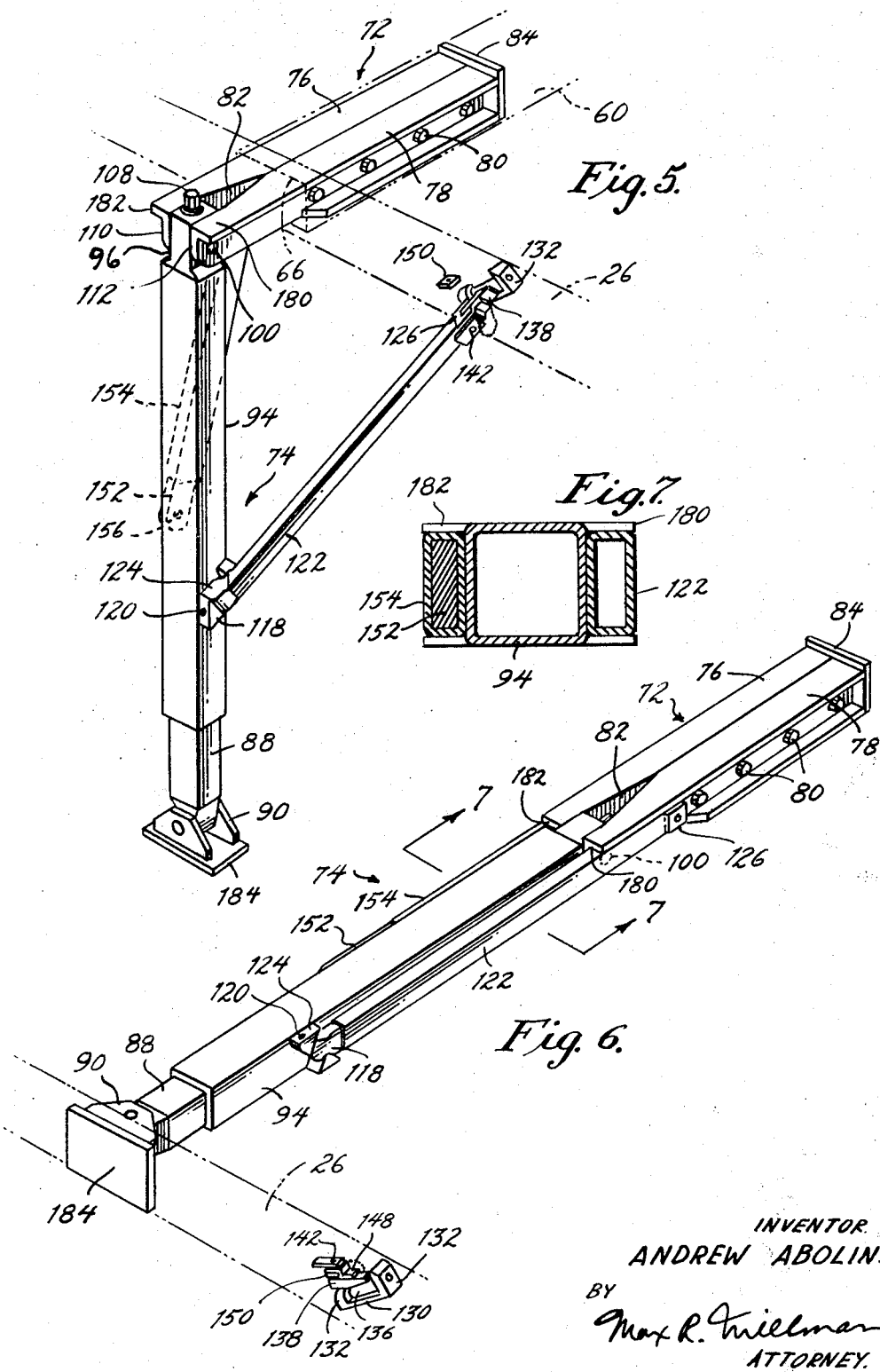

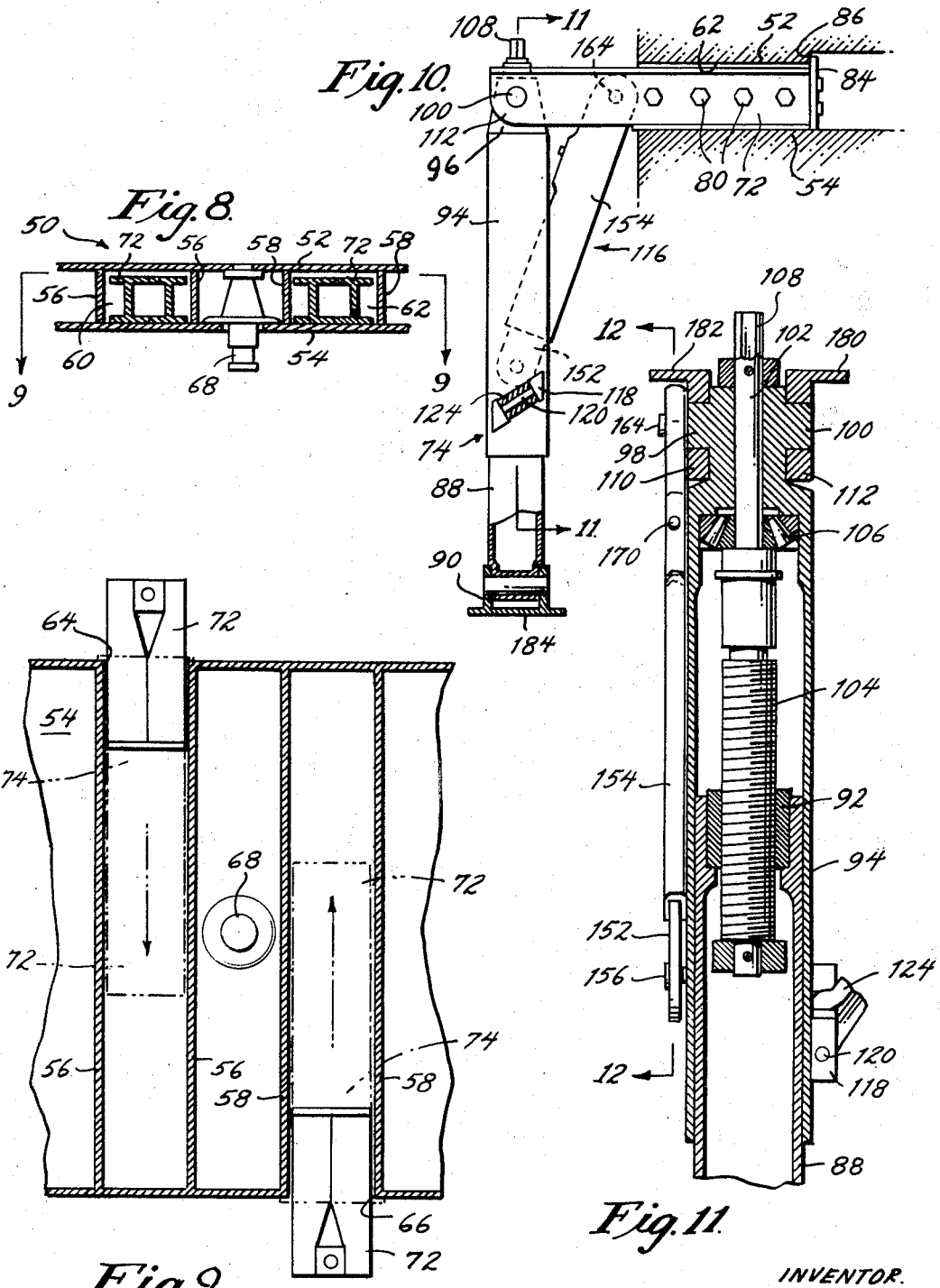

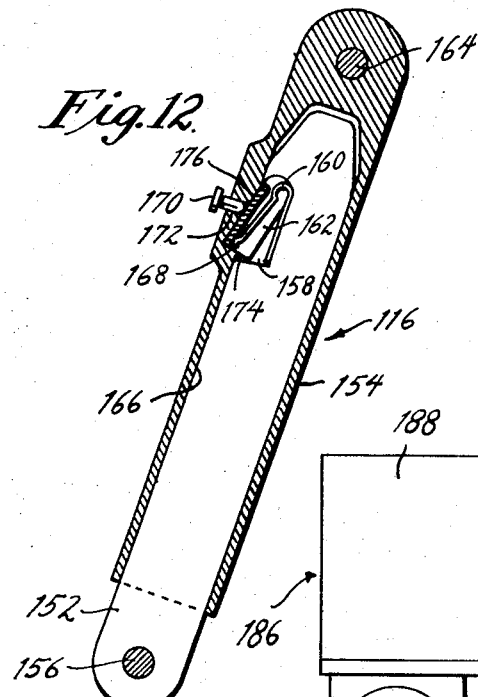
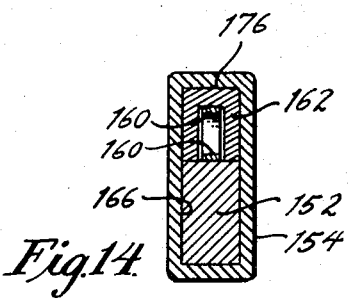
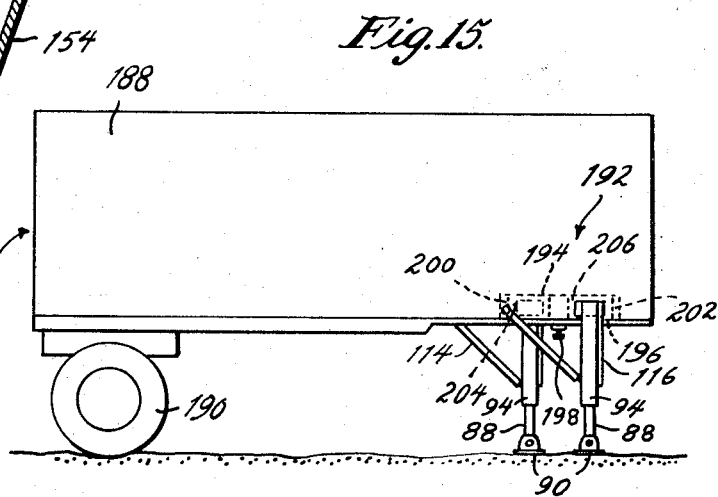
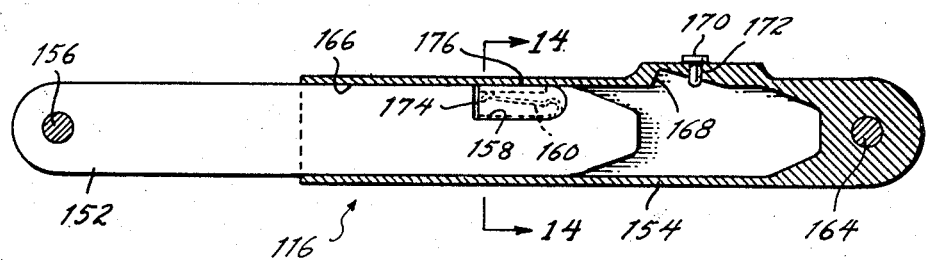
INVENTOR.
ANDREW ABOLINS

3,448,998
FOLDABLE STORABLE LANDING GEAR
Andrew Abolins, Langhorne, Pa., assignor to Strick Corporation, Fairless Hills, Pa., a corporation of Pennsylvania
Filed Jan. 18, 1967, Ser. No. 610,070
Int. Cl. B60g 25/00; B62d 53/06
U.S. Cl. 280—415                    7 Claims

ABSTRACT OF THE DISCLOSURE

Landing gear or supports for a vehicle which is comprised of a van size cargo container and a chassis substantially coextensive with the container including running gear and upon which chassis the container is demountably attached. The chassis includes a king pin assembly at its front end which has transverse pockets and the landing gear is movable from inoperative stored positions in the pockets to operative support positions outboard of the chassis so that the wheels of a tractor can pass between the landing gear to effect coupling of the tractor to the king pin of the chassis.

---

The primary object of this invention is to provide landing gear or support legs for a vehicle which can be positioned as far forward as possible to prevent nosing down of the vehicle due to an unbalanced load at the forward end of the body, yet permit passage of the wheels of a tractor between the legs when they are in their support positions so that the tractor may be readily coupled to the vehicle.

Another object is to provide landing gear of the character described which can be stored in their inoperative positions in transverse pockets beneath the body adjacent its front end or in the chassis upon which the body is demountably attached and can be slid out of the pockets to assume support positions outboard of the body or chassis.

Another object of the invention is to provide landing gear of the character described in which each landing gear or support leg comprises an inner and an outer member pivoted together about an axis which extends longitudinally of the body or chassis, the outer member being height adjustable and assumes a vertical support position when the landing gear is withdrawn from its pocket to a predetermined point, there being means to effect the height adjustment at the top of the outer member which does not interfere with its pivotal connection to the inner member.

Another object of the invention is to provide landing gear or support legs with lateral or longitudinal braces that are storable with each leg in its inoperative position of retraction in a transverse pocket, it being necessary to detach only one of said braces from its connection to the body or chassis, the other brace being a telescoping member with means to releasably retain the same in its collapsed and its extended position.

These and other objects of the invention will become more apparent as the following description proceeds in conjunction with the accompanying drawings, wherein:

FIG. 1 is a perspective view of a container, partly in phantom shown mounted on a chassis or adapter frame;

FIG. 2 is a fragmentary diagrammatic elevation view of one front corner of the vehicle;

FIG. 3 is a fragmentary side view similar to FIG. 2;

FIG. 4 is an enlarged perspective view of one end of the fore and aft brace showing its removable connection to the chassis;

FIG. 5 is a perspective view of one of the landing gears shown in the operative support position;

FIG. 6 is a perspective view of one of the landing gears shown in the inoperative retracted stored position;

FIG. 7 is a sectional view taken on the line 7—7 of FIG. 6;

FIG. 8 is an enlarged sectional view taken on the line 8—8 of FIG. 1;

FIG. 9 is a sectional view taken on the line 9—9 in FIG. 8;

FIG. 10 is a sectional view taken on the line 10—10 of FIG. 1;

FIG. 11 is a sectional view taken on the line 11—11 of FIG. 10;

FIG. 12 is a sectional view of the lateral brace taken on the line 12—12 of FIG. 11;

FIG. 13 is a view similar to FIG. 12 showing the movable relation between the telescoping members of the lateral brace;

FIG. 14 is a sectional view taken on the line 14—14 of FIG. 13; and

FIG. 15 is a side elevational view, partly diagrammatic, of a vehicle without a removable chassis or adapter frame and embodying the principles of the invention.

Specific reference is now made to the drawings in which similar reference characters are used for corresponding elements throughout.

In the conventional 20′ semi-trailer the support legs or landing gear are located approximately midway of the body so that when it rests only on its support legs and its running gear, noising down of the body can occur when there is a greater load in front of the support legs or during unloading when the cargo at the rear is removed first. It is therefore desirable to provide support legs as far forward of the body as possible. However, if this is done without more, the support legs will interfere with the wheels of a towing vehicle or tractor which must be coupled to and uncoupled from the front end of the body. Hence in their operative or support positions the legs or landing gear must be outboard of the body and free of the tractor wheels. The principles of the invention which accomplish this while applicable directly to a vehicle having a body mounted directly on running gear is more particularly adapted for use with a vehicle in which the body is a van size cargo container which is demountably attached on a chassis or adapter frame which in turn mounts the wheeled unit or bogie of the type shown in FIG. 1 and described in copending application Ser. No. 461,393 filed June 5, 1965, now Patent No. 3,317,219.

The container 10 is a van size cargo or trailer body of stressed skin construction whose sidewalls 12 consist of metallic sheets in the form of panels which are secured to and between vertical posts (not shown) the function of which is to prevent buckling of the sidewalls. The panels and posts are secured by appropriate means to a top longitudinal rail 14 and a bottom longitudinal rail 16. This construction is continued for the end walls 18 except that the rear end wall (not shown fully) will contain the usual doors. To complete the container, which is preferably rectangular a roof sheet 20 is secured to the top rails and cross sills (not shown) are connected across the bottom rails 16 upon which a floor (not shown) is installed. In this stressed skin construction, known in the trade as frameless, a load on the floor is taken by the sidewalls 12 whose skin is an essential part of the load-carrying system.

Each corner has secured structurally into the container a member or casting 22 of a consrtuction to be later described in detail. It is through these corner members that the containers may be removably coupled horizontally or end to end and that the adapter frame or chassis 24 is coupled to the container.

The chassis or adapter frame preferably runs the full length and width of the container and comprises longitudinal side beams 26 joined by cross members 27.

The hweeled unit or bogie 28 consists essentially of a frame having cross members 30 joined by longitudinal side members 32. The bogie frame flexibly mounts springs on both sides thereof (not shown) which centrally support a single transverse axle 34 which in turn mounts wheels 36 at its ends. The bogie is, of course, provided with a brake mechanism and hose connections to the emergency and service lines of the tractor, as is well known in the art.

Affixed by welding or other suitable means to the bottom of side members 26 of the adapter frame and extending for a predetermined length to the rear thereof are track angles, each including a vertically extending portion 38 preferably at an angle of about 75° to the horizontal which includes longitudinally spaced apertures 40 that are in transverse alignment with the apertures on the track angle on the other side of the adapter frame.

Each bogie is equipped with a releasable coupling mechanism of the type shown and described in Patents Nos. 3,004,772 and 2,831,700 consisting of crank-operated spring urged pins 42 which extend laterally through members adjacent the corners of the bogie frame. When the pins are released they extend as well through selected apertures 40 in the track angles and thus couple the bogie to the adapter frame in adjusted positions. When the pins 42 are retracted, the bogie is free to slide beneath the adapter frame.

The corner members 22, each have at least a vertical wall with a slot 44 opening therethrough, a horizontal wall substantially perpendicular thereto with a slot 46 therethrough and an enlarged recess (not shown) therebehind.

If one desires to couple the containers horizontally or end to end a means (not shown) can be used of the semiautomatic type shown and described in Patent No. 2,972,175 which is capable of transmitting very large tensional and shear forces from container to container. Such couplers are employed to connect the containers only at their lower confronting ends via the slots 44 of the lower corner members 22 whereas members (not shown) to take compression only can be inserted and retained in the upper corner members through the slots 44 of one container which have portions that fit into the slots 44 of the upper corner members of an adjoining container, as shown and described in said copending application Ser. No. 461,393 filed June 4, 1965, now Patent No. 3,317,219.

The means to detachably couple the adapter frame 24 to each container may consist of a rod (not shown) which is mounted in a suitable bearing or opening in the member 26 adjacent each corner of the frame for rotation about a vertical axis, the upper end of the rod mounting an enlarged tapered head 48 shaped similarly to slot 46 of the corner member 22 and having a maximum cross-sectional area approximating that of the slot 46 so that when it traverses the same coupling is effected between the adapter frame and the container.

Adjacent its front end and as far forward as is practical, the chassis or adapter frame 24 is provided with a king pin assembly 50 which consists of spaced upper and lower plates 52 and 54 which traverse the chassis and are affixed to the side rails 26 thereof. Longitudinally spaced transversely extending pairs of reinforcing bars 56 and 58 are secured between the plates forming thereby longitudinally spaced transversely extending pockets or tunnels 60 and 62 which open through the opposite side rails 26 of the chassis as at 64 and 66, the king pin 68 being retained by upper and lower plates 52 and 54 centrally of the assembly and between the pockets 60 and 62.

Associated with each pocket is a landing gear unit 70 and since each unit is the same, a single description will suffice. The unit includes an inner or outrigger portion 72 and an outer or support portion 74 pivoted thereto. The outrigger portion 72 is preferably formed of two channel members 76 and 78 which are bolted or otherwise connected together as at 80, the outer ends of the channel members being separated to form a clevis with an opening 82. The inner ends of the channel members 76 and 78 are provided with a plate 84 which is adapted to engage a shoulder 86 in each pocket adjacent its opening 64 or 66 to limit the outward movement of outrigger portion 72.

The support member or leg 74 is height adjustable and comprises a lower tubular member 88 to which a ground-engaging foot 90 is pivoted, the upper end of which member 88 being provided with an internally threaded jack nut 92. An upper tubular member 94 internally receives the lower member 88. The upper end of the member 94 which is generally rectangular in cross section is diametrically reduced as at 96 and formed with opposed horizontally extending trunnions 98 and 100. The reduced portion 96 of the member 94 is provided with a bore through which extends the stub shaft 102 of an externally threaded jack screw 104 which is engaged in the jack nut 92, there being appropriate thrust bearings 106 for the jack screw in the member 94 adjacent the reduced portion 96 thereof. The stub shaft of the jack screw contains a hex head 108 at its upper end which is exposed beyond the upper end of the member 94. The reduced portion 96 at the upper end of the member 94 extends into the opening 82 of the clevis of outrigger member 72 which forms, in effect, spaced arms 110 and 112 which straddle said reduced portion 96 and are provided with openings to receive the trunnions 98 and 100. Thus the support leg 74 is pivoted to the outrigger member 72 around an axis passing through the trunnions which is longitudinal of the chassis 24 and the body or container 10, and the leg is nevertheless height adjustable via the hex head 108 at the top of the leg.

Two braces are provided for each landing gear unit, one 114 to brace the leg fore and aft, and the other 116 to brace the leg laterally. Coming first to the fore-aft brace 114, in its operative position it is obliquely oriented relative both to the leg and to the chassis or container. To accomplish this a clevis 118 is affixed to the member 94 adjacent its lower end, the clevis including a pin 120 which is in a lateral plane but at an angle to the axis of the leg 74, preferably an angle of 55°. The brace 114 includes an elongated tubular member 122 whose lower end 124 is inclined to correspond to the inclination angle of the pin 120 and includes a bore which journals the pin.

The other end of the member 122 is provided with a clevis 126 having a through bore 128. Affixed to side rail 26 is hinge bracket 130 which includes spaced lugs 132 with a pin 134 extending therebetween and a tubular member 136 journaled on the pin between the lugs. The inclination of the pin is downwardly and forwardly relative to the chassis 24 or container 10. Welded or otherwise affixed to the tubular journal 136 is a tongue 138. When the member 136, 138 is rotated so that the tongue 138 becomes coaxial with the brace tube 122, its free end 140 can be inserted in the clevis 126 and there retained by a pin 142 which extends through the bore 128 of the clevis and a bore 144 through the free end 140 of the tongue 138. As will appear hereinafter to store the landing gear 70 in the pocket 60 or 62 requires disconnection of the inner end of the brace 114 from the chassis or container. Thus the pin 142 is removable from the clevis, the same being retained by a suitable chain 146 on a clip 148 which is preferably secured to the tongue and has an offset portion 149 spaced from the tongue containing an aperture which is aligned with the bore 144 of the tongue. When the pin 142 is removed from the bore 144 of the tongue, the clevis 126 and the clip 148, the member 136, 138 is rotated so that the tongue 138 is disposed against the rail, in which position its bore 144 aligns with the hole of a lug 150 which is affixed to the side rail and the pin 142 is then reinserted in the hole of the clip 148 and through the hole of lug 150 to retain the member 136, 138 in its inoperative position on the side rail 26.

Coming now to the lateral brace 116, the same comprises a bar 152 which is telescopingly received in a tubular member 154. The outer end of the bar 152 is pivoted as at 156 to the member 94 of the landing gear leg 70 around an axis which is longitudinal relative to the chassis or container. The inner end of the bar is notched out as at 158 and into which is first placed a spring 160 and a locking pawl 162, the spring urging the pawl upwardly.

The upper end of the tubular member 154 is pivoted as at 164 to outrigger member 72. The bore 166 of the tubular member 154 is substantially uniform for its major length but at a predetermined point towards its upper end it enlarges to form a shoulder 168. A release button 170 is movably mounted in a bore 172 laterally through one edge of the tubular member 154 at a point just beyond the shoulder 168. In the collapsed position of the bar 152 in the tubular member 154, i.e. when the landing gear is in its operative supporting position, the spring 160 urges the pawl 162 outwardly against the button 170. However, its front edge 174 abuts the shoulder 168 and thus limits outward movement of the bar 152 in the tubular member 154. To extend the lateral brace 116 as is required for the inoperative or storage position of the landing gear, the button 170 is depressed pushing the pawl 162 within the confines of the notch 158 in the bar 152 so that its outer face 176 is flush with that of the bar 152. With the button so depressed the bar 152 is pulled outwardly until the edge 174 of the pawl clears the shoulder 168 thus unlocking the bar 152 for the continued extensible movement.

In use, in the support position, the outrigger members 72 remain in horizontal positions and extend through the openings 64 and 66 of the pockets 60 and 62 on opposite sides of the chassis 24 a predetermined distance beyond the side rails 26, the distance being fixed by the engagement of plates 84 engaging the shoulders 86 of the pockets. The support members 74 extend vertically and can be height adjusted by application of a wrench to the hex head 108 of the jack screw. The lateral braces 116 in this support position are extended and the fore-aft braces 114 are terminally secured to the support member 74 and the chassis 24 and are obliquely oriented relative both to the support member 74 and the chassis. The support members 74 are staggered in the fore and aft direction and as close to the front end of the chassis and container as possible, but they are outboard of the chassis or container a distance sufficient to permit free passage of the wheels 178 of a tractor (not shown) for coupling or uncoupling to the king pin 68.

To move each landing gear to its inoperative or storage position, the support member 74 is first reduced in height. Then pin 142 is removed from the clevis 126 at the upper end of the fore-aft brace 114 and the members 136 and 138 are rotated against the side rails 26 and there retained by reinserting the pin through the clip 149, bore 144 and the lug 150. The tubular member 122 of the brace is then positioned against one side face of the upper member 94 of the support 74, the member 122 being dimensioned cross-wise to fit within the confines of the flange 180 of one of the extensions or arm 112 of the outrigger 72. The button 70 is then depressed and the support member 74 is pulled upwardly in an arc around the pivot axis through the trunnions 98 and 100 until the edge 174 of the pawl 162 clears the shoulder 168. In so doing the lateral brace 116 extends until the member 74 is in substantial horizontal alignment with the outrigger member 72. Then the entire unit is pushed inwardly in each pocket. In the final stored position, lateral brace 116 extends along the other side of the member 94 and its tubular portion 154 is also dimensioned, as is member 122, to be confined within the flange 182 of the extension or arm 110 of the outrigger member 72 to make a compact unit. In the final stored position the outrigger member 72 and the entire support member 74 is confined within the pocket except for the foot pad ground-engaging plate 184 of single metal thickness which bears against the bottom rail 26 and may be confined therein if the rail is of channel profile.

The aforementioned operation and principles of the invention are applicable to a vehicle 186 without a separable chassis or adapter frame as shown in FIG. 15. In that case the body or container 188 is mounted on a wheeled unit or bogie 190 adjacent its rear end. Closely adjacent its front end, a king pin assembly 192 is secured to the bottom of the body of the type previously described and shown more particularly in FIGS. 8 and 9, the same including upper and lower plates 194 and 196 from which the king pin 198 depends in a central position, there being spaced pairs of transverse reinforcing bars 200 and 202 forming longitudinally spaced transverse pockets 204 and 206 between each pair. Thus the pockets are formed in the body or container 188 itself and the landing gears and their braces are operatively connected therein in the manner described hereinbefore.

Although, a particular embodiment of the present invention has been herein illustrated and described, it is not intended to limit the invention to such disclosure, but changes and modifications may be made therein and thereto within the scope of the following claims.

I claim:

1. In combination with a vehicle including: a wheeled unit; and an elongated chassis having said wheeled unit mounted thereon adjacent its rear end; a landing gear comprising:
   (a) means forming pockets extending transversely of said chassis adjacent its front end and opening through opposite sides thereof;
   (b) an outrigger member slideable in said pocket and including an outer end extendable through the pocket opening;
   (c) a support leg;
   (d) means mounting said leg on said outer end of said outrigger member for pivotal movement about an axis subtsantially parallel to the longitudinal axis of said chassis;
   (e) means operable adjacent said pivot means to adjust the height of said support leg;
   (f) a fore and aft brace in a lateral plane to said chassis;
   (g) means pivoting one end of said fore and aft brave at an oblique angle to said support leg;
   (h) means removably pivoting the other end of said fore and aft brace at an oblique angle to said chassis, including:
      (1) a clevis at said other end of said fore and aft brace;
      (2) a bracket mounted on said chassis having a member rotatable thereon about an oblique angle with said chassis, a tongue fastened at one end to said rotatable member, said other end of said tongue being insertable in said clevis; and
      (3) means removably fixing said tongue in said device for pivotal movement therewith;
   said support leg being retractable with said outrigger member when in substantial horizontal alignment therewith into said pocket for storage in an inoperative non-support position, and said support leg being removable from said pocket until said outer end of said outrigger member extends through said pocket opening a predetermined distance outboard of the chassis so that said support leg can be pivoted to a vertical ground-engaging operative supporting position.

2. In combination with a vehicle including: a wheeled unit, and an elongated chassis having said wheeled unit mounted thereon adjacent its rear end; a landing gear comprising:
   (a) means forming pockets extending transversely of said chassis adjacent its front end and opening through opposite sides thereof;

(b) an outrigger member slideable in said pocket and including an outer end extendable through the pocket opening;

(c) a support leg;

(d) means mounting said leg on said outer end of said outrigger member for pivotal movement about an axis substantially parallel to the longitudinal axis of said chassis;

(e) a lateral brace having telescoping members terminally pivoted to said leg and said outrigger member; and (f) means to releasably lock said telescoping members of said lateral brace in their fully retracted positions when said landing gear is in an operative support position;

said releasable lock means including:

(1) a spring-urged pawl carried adjacent the free end of the inner of said telescoping members;

(2) a shoulder in the outer of said telescoping members adjacent its pivoted end; and (3) a depressable button bearing on said pawl and extending through an edge of said outer telescoping member intermediate its shoulder and its pivoted end so that when said pawl engages said shoulder said telescoping members cannot be extended until said button is depressed and said pawl clears said shoulder;

said support leg, lateral brace and outrigger member being horizontally alignable upon movement of said leg in an arc upwardly about its pivot point so as to be retractable as a unit into said pocket for storage in a non support-position, and said members being removable from said pocket until said outer end of said outrigger member extends through said pocket opening a predetermined distance outboard of the chassis so that said support leg can be pivoted to a vertical ground-engaging operative supporting position.

3. In combination with a vehicle including: a wheeled unit; and an elongated chassis having said wheeled unit mounted thereon adjacent its rear end; a landing gear comprising:

(a) means forming pockets extending transversely of said chassis adjacent its front end and opening through opposite sides thereof;

(b) an outrigger member slideable in said pocket and including an outer end extendable through the pocket opening;

(c) a support leg;

(d) means mounting said leg on said outer end of said outrigger member for pivotal movement about an axis substantially parallel to the longitudinal axis of said chassis;

(e) a lateral brace having telescoping members terminally pivoted to said leg and said outrigger member;

(f) a fore and aft brace in a lateral plane to said chassis;

(g) means pivoting one end of said fore and aft brace at an oblique angle to said support leg; and (h) means removably pivoting the outer end of said fore and aft brace at an oblique angle to said chassis; including:

(1) a clevis at said other end of said fore and aft brace;

(2) a bracket mounted on said chassis having a member rotatable thereon about an oblique angle with said chassis, a tongue fastened at one end to said rotatable member, said other end of said tongue being insertable in said clevis; and (3) means removably fixing said tongue in said clevis for pivotal movement therewith;

said support leg, lateral brace and outrigger member being horizontally alignable upon movement of said leg in an arc upwardly about its pivot point so as to be retractable as a unit into said pocket for storage in the non-support position; and said members being removable from said pocket until said outer end of said outrigger member extends through the pocket opening a predetermined distance outboard of the chassis so that said support leg can be pivoted to a vertical ground-engaging operative supporting position.

4. In combination with a semi-trailer structure, including: a wheeled unit; and an elongated chassis capable of being removably coupled to a tractor and having said wheeled unit mounted thereon adjacent its rear end; a landing gear comprising:

(a) means forming pockets extending transversely of said chassis adjacent its front end and opening through opposite sides thereof;

(b) an outrigger member slideable in said pocket and including an outer end extendable through the pocket opening;

(c) a support leg;

(d) means mounting said leg on said outer end of said outrigger member for pivotal movement about an axis substantially parallel to the longitudinal axis of said chassis;

(e) a lateral brace having telescoping members terminally pivoted to said leg and said outrigger member;

(f) means to releasably lock said telescoping members of said lateral brace in their fully retracted positions when said landing gear is in an operative support position;

(g) a fore and aft brace in a lateral plane to said chassis;

(h) means pivoting one end of said fore and aft brace at an oblique angle to said support leg; and (i) means removably pivoting the other end of said fore and aft brace at an oblique angle to said chassis; said support leg, lateral brace and outrigger member being horizontally alignable upon movement of said leg in an arc upwardly about its pivot point so as to be retractable as a unit into said pocket for storage in the non-support position; said members being removable from said pocket until said outer end of said outrigger member extends through the pocket opening a predetermined distance outboard of the chassis so that said support leg can be pivoted to a vertical ground-engaging operative supporting position.

5. The combination of claim 4 wherein said support leg includes telescoping members, a nut carried by one member, a jack screw extending through said members engaged in said nut and including a wrench-engageable portion disposed exteriorly of one end of said other member, said means pivotally mounting said leg on said outer end of said outrigger member including a clevis at said outer end of said outrigger having spaced arms straddling said one end of said other member and trunnions extending laterally from said one end of said other member and journaled in said arms thereby forming a pivotal connection which traverses but does not intersect said jack screw.

6. The combination of claim 4, a container substantially coextensive with said chassis and means demountably coupling said container on said chassis.

7. In combination with a semi-trailer structure including: a container capable of being removably coupled to a tractor; a wheeled unit coupled to said container adjacent its rear end; a landing gear comprising:

(a) means forming pockets extending transversely of said container adjacent its bottom and its front end and opening through opposite sides thereof;

(b) an outrigger member slideable in said pocket and including an outer end extendable through the pocket opening;
(c) a support leg;
(d) means mounting said leg on said outer end of said outrigger member for pivotal movement about an axis substantially parallel to the longitudinal axis of said container;
(e) a lateral brace having telescoping members terminally pivoted to said support leg and said outrigger member;
(f) means to releasably lock said telescoping members in their fully retracted positions when said landing gear is in an operative support position;
(g) a fore and aft brace in a lateral plane;
(h) means pivoting one end of said fore and aft brace at an oblique angle to said support leg; and
(i) means removably pivoting the other end of said brace at an oblique angle to said chassis; said support leg, lateral brace, fore and aft brace, and outrigger member being horizontally alignable upon movement of said leg in an arc upwardly about its pivot point so as to be retractable as a unit into said pocket for storage in an inoperative non-support position; and said members removable from said pocket until said outer end of said outrigger member extends through the pocket opening a predetermined distance outboard of the container so that said support leg can be pivoted to a vertical ground-engaging operative supporting position.

References Cited

UNITED STATES PATENTS

| | | | |
|---|---|---|---|
| 1,757,260 | 5/1930 | Silverman | 108—132 |
| 2,555,336 | 6/1951 | Hagely | 254—86 |
| 3,024,042 | 3/1962 | Abolins | 280—150.5 |
| 3,063,667 | 11/1962 | Doty | 248—150 |
| 3,096,065 | 7/1963 | Horne | 280—150.5 X |
| 3,102,738 | 9/1963 | De Roshia | 280—415 |
| 3,163,306 | 12/1964 | Bennett et al. | 214—515 |
| 3,332,661 | 7/1967 | Hand | 214—515 X |

LEO FRIAGLIA, *Primary Examiner.*

U.S. Cl. X.R.

254—86; 280—423